(12) United States Patent
Henriquez (10) Patent No.: US 7,254,786 B2
(45) Date of Patent: Aug. 7, 2007

(54) SYSTEM FOR TRANSMITTING AND DISPLAYING ICON RESOURCES GROUP ASSOCIATED WITH REMOTE APPLICATION TO A LOCAL COMPUTING SYSTEM TO FACILITATE VIRTUALIZATION OF THE REMOTE APPLICATION

(75) Inventor: Alberto Henriquez, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/288,118

(22) Filed: Nov. 5, 2002

(65) Prior Publication Data

US 2004/0088377 A1 May 6, 2004

(51) Int. Cl.
*G06F 3/048* (2006.01)
(52) U.S. Cl. ..................... 715/835; 715/810
(58) Field of Classification Search ............. 709/219, 709/203, 227, 225; 715/363, 835, 810; 710/11; 379/88.17
See application file for complete search history.

(56) References Cited

U.S. PATENT DOCUMENTS

| | | | | |
|---|---|---|---|---|
| 2002/0007391 | A1* | 1/2002 | Suzuki | 709/203 |
| 2002/0112058 | A1* | 8/2002 | Weisman et al. | 709/227 |
| 2002/0124082 | A1* | 9/2002 | San Andres et al. | 709/225 |
| 2003/0101294 | A1* | 5/2003 | Saint-Hilaire et al. | 710/11 |
| 2003/0191799 | A1* | 10/2003 | Araujo et al. | 709/203 |
| 2004/0013246 | A1* | 1/2004 | Back et al. | 379/88.17 |

OTHER PUBLICATIONS

Hornick, "Icons in Win32", Microsoft Corporation, Sep. 29, 1995, pp. 1-8.*
Daub, "DaubNet: File Formats Collection: ICO", www.daubnet. com/formats/ICO.html, Mar. 9, 2000.*
Hemang Lavana, Amit Khetawat and Franc Brglez "Internet-based Workflows: A Paradigm for Dynamically Reconfigurable Desktop Environments" CBL, Department of Computer Science, North Carolina State University, Technical Report May 1997.
Lawrence G. Palmer and Ricky S. Palmer, Shared Desktop: Collaborative Tool for Sharing 3-D Applications among Different Window Systems, Digital Technical Jornal, vol. 9, No. 3, 1997.

* cited by examiner

*Primary Examiner*—Le Hien Luu
(74) *Attorney, Agent, or Firm*—Amin, Turocy & Calvin, LLP (57) ABSTRACT

The present invention relates to a system and methodology for transmitting icon information from a remote system to a local system. The icon information is extracted from an application residing on the remote system. The icon information is then encoded and stored until it is requested by the remote system. When the application is remotely accessed by the local system, the icon information is pushed to the local system. The local system decodes the information and displays the icon to a user. The icon is displayed such that the application appears to reside on the local system, rather than the remote system, where it actually resides.

43 Claims, 8 Drawing Sheets

SYSTEM FOR TRANSMITTING AND DISPLAYING ICON RESOURCES GROUP ASSOCIATED WITH REMOTE APPLICATION TO A LOCAL COMPUTING SYSTEM TO FACILITATE VIRTUALIZATION OF THE REMOTE APPLICATION

TECHNICAL FIELD

The present invention relates generally to computer systems, and more particularly to a system and method for marshalling icon information from a remote system to a local system.

BACKGROUND OF THE INVENTION

With the popularity of laptop computers, virtually all major business enterprises use e-mail for internal and external communications, mobile phones are commonplace, and many people carry personal digital assistants (PDAs) with wireless communication capability. Internet cafes are found in most major cities, airports routinely have Internet kiosks, and many hotel rooms are equipped with data communication facilities.

With these developments come limitations and frustrations-laptops and notebooks frequently require special applications to be installed. If work needs to be done when a particular computing system is unavailable, oftentimes the work must be postponed until the system is available. In addition, some employees do not have laptops but nonetheless need to access information and applications when away from the office. Data on laptops must be synchronized with data on the enterprise's central computers in order to mitigate file contention, incorrect versions and overall confusion. Before employees can work on their laptops, they must be certain that they have the latest information, and that after they have completed working on data, the corresponding data at the centrally housed location is updated.

Many enterprises have realized significant benefits from client/server technology, but this typically involves installation of specialized software on client systems, thereby limiting access to only devices with the specialized software thereon as well as placing a maintenance burden on the organization, which must propagate changes and updates to all individual workstations, laptop computers, etc. As organizations implement individual applications, frequently in different languages, functionality and data often became fragmented.

A growing amount of valuable information is available from web-based service providers. However, locating the information can be time-consuming let alone the problems associated with receiving informations as disparate chunks of data. Consequently, the aforementioned limitations can hamper individual's ability to perform work at a desired moment. The information would be more valuable if the information were made available to corporate applications and merged with enterprise data. Competitive business pressures make this issue even more urgent. For example, not so long ago, it was acceptable for a salesperson to return to a customer's office the following day with requested information. Today, however, immediacy and convenience are key elements to remaining competitive in a global economy; with the Internet, people have become accustomed to accessing data on demand and taking immediate action with respect thereto. Any work that must be postponed because of in access to applications or data can mean lost opportunity.

With a Remote Desktop feature in some versions of MICROSOFT® WINDOWS®, a computer can be remotely controlled from another office, from home, or while traveling. Such remote access allows data, applications, and network resources that are on an office computer to be utilized, without an individual having to be physically present in an office. A Remote Desktop file (.rdp) file contains substantially all information necessary for connection to a remote computer, including settings that were configured when the file was saved. Any number of .rdp files can be customized, including files for connecting to the same computer with different settings. For example, a file that connects to a computer can be saved in full screen mode and another file that connects to the same computer can be saved in 800×600 screen size. Although such remote access capabilities greatly facilitate overcoming some of the aforementioned problems associated with information access, the overall user client-side experience is far from desirable as compared to the experience at the host computer end. In other words, emulation of applications, icons, etc. at the data accessing end in conventional remote access systems is primitative and bland, which is understandable given that integrity with respect to application functionality is an overriding concern. However, there is an unmet need with respect to enriching an overall user experience during remote computer access/interaction.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods for communicating between at least one remote system and at least one local system. The invention enriches a user experience with respect to remote accessing of information. Conventional remote access systems oftentimes provide an interface at a local system that is basically functional, however, limited with respect to richness of the respective interface displayed at the local computer during a remote access session. The subject invention provides system(s) and method(s) that enhance a display of a local computer during a remote access session, for example. The local system(s) can run at least one application residing on the remote system(s). In order to create the appearance as if the application(s) actually resides on the local system(s), the remote system(s) sends icon information for the application(s) to the local system(s). Accordingly, the icon(s) displayed at the local computer substantially match in appearance as well as functionality the iconic counterparts residing at the remote system(s). A formal remote session between the local system(s) and the remote system(s) can be established upon transmittal of the iconic information or upon activation of the icon(s) at the local system(s).

More particularly, and in accordance with one specific aspect for carrying out the present invention, an application at a remote computer is scanned for an associated icon resource group. Icon data is collected from the icon resource group and the icon data is converted from a file format to a flat memory model (e.g., ico format), which is then converted into a .net stream object, for example. The converted data is encoded (e.g., uuencoding), and the encoded icon data is packaged as an XML document for example for transmission to a local computing system. The subject invention provides a user at a local computing system a relatively seamless environment in which to conduct remote computing access of applications. To the user, the accessed application(s) and associated icon(s) appear as if resident at the local computing system.

According to an aspect of the present invention, a distributed computing system is provided which includes at least one local system and at least one remote system operatively coupled via a communications link or channel. The remote system(s) includes an application running resident on a remote computer or server. A user interface is generated at the remote computer or server for the application and virtualized at one or more client computers (e.g., local computers) via a dynamically created interface. The virtualization of the application includes icon information for generating an application icon on the client computer(s). Thus, the user interface appears as if the application were running locally on the client computer(s).

According to another aspect of the present invention, a system and method are provided for marshalling icon information between at least one remote system and at least one local system. The remote system(s) can include a locate component to locate at least one icon resource group from at least one application. The remote system(s) can also include an extract component to extract icon resources from at least one desired application. The remote system(s) can further include an encode component to encode the extracted icon information. A transmit component is included in the remote system(s) to transmit the encoded icon information to the local system(s) via a communications channel. It is to be appreciated that the icon information can be extracted and/or encoded by a first remote system and the icon information can be transmitted to a local system(s) by a second remote system.

The local system(s) includes a receive component to receive the icon information from the remote system(s). The local system(s) also includes a decode component to decode the encoded icon information. When the icon information is decoded, at least one application icon can be displayed to a user of the local system(s). Thus, to the user, it appears as if the remote application(s) is installed on the user device. However, both the data being processed and the remote application(s) are on the remote system(s).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "icon" is understood to apply to any graphical or non-textual representation of entities including, but not limited to, commands, objects, files, folders, storage media, applications, and the like.

It is to be appreciated that various aspects of the present invention employ representations of deterministic policies specified as functions or rules that take as arguments contextual information, details about the nature of the participants, and the content or task at hand as well as availability of resources. One example of the present invention also employs technologies associated with facilitating inference and decision making under uncertainty and optimization of expected utility and/or minimization of expected costs. Thus, statistical inference can be performed with models constructed by hand, from data with machine learning methods, or by a mixture of machine learning and human assessment. Such models can be used in conjunction with deterministic policies where, depending on the context, an inferential rule or deterministic rule is used. For example, inferences with respect to available resources can be made Context can be abstracted by examining, for example, the nature of the remote access, the privilege level of the accessor, the time of day at which the access is being made, the project(s) to which the access pertains, available computational resources, etc. Thus, multiple attributes concerning people, including their preferences, contexts, tasks and priorities are analyzed to facilitate establishing and adapting policies relating to transmittal of iconic information in connection with the subject invention.

A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models in accordance with the present invention.

Figure 1:
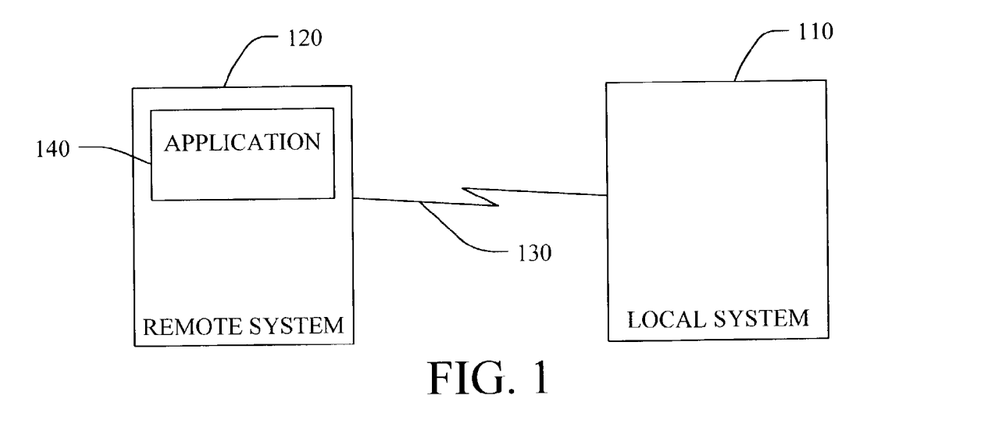
FIG. 1 is schematic block diagram of a distributed computing system in accordance with an aspect of the present invention.

Referring initially to FIG. 1, a high level schematic block diagram illustrates an example of a distributed computing system 100 for providing interactive communication between at least one local system 110 and at least one remote system 120. The local system(s) 110 includes one or more local or client computers (e.g., a personal computer, PDA, mobile telephone, a workstation . . . ). The remote system(s) 120 includes one or more remote computers, which can be for example, a workstation, a server, a router, a peer device, or other common network node, and typically includes many or all of the elements described relative to the remote system(s) 120. The local and remote systems 110 and 120 are operatively coupled via a communications link or channel 130. The local and remote systems 110 and 120 communicate via the channel 130 by employing an agreed upon network communications protocol.

The communications channel 130, for example, connects a client computer to a Terminal Server session of a server. As is known in the art, Terminal Server provides a multi-user core that supports the ability to host multiple, concurrent client sessions on an operating system, such as versions 4.0 and higher of the WINDOWS NT SERVER® operating systems developed by Microsoft Corporation of Redmond, Wash. Terminal Server employs a Remote Desktop Protocol (RDP), which allows a client to communicate with the Terminal Server over the network connection. Briefly stated, the Terminal Server session enables applications to execute on the server and communicate a remotely generated user interface over a connection which is displayed locally at the client. It is to be understood and appreciated that the present invention is platform and operating system independent; other operating systems and other communications protocols may be employed to implement the present invention.

By way of example, a Distributed Computing Environment (DCE) Object Remote Procedure Call (ORPC) facility may be employed to connect the remote computer with the client computer via the channel 130, although other facilities may also be used. WINDOWS NT® operating system from Microsoft of Redmond, Wash., for example, provides DCE ORPC functionality via an ORPC channel object that encapsulates the details about the underlying cross-process and cross-network transport. The DCE ORPC channel object employs a generic ORPC transport provider interface to communicate with a remote transport protocol. The transport provider interface acts as thin layer between the DCE ORPC facility and the network transport, mapping ORPC operations onto the functions provided by the network transport. The ORPC facility implements transport providers (e.g., DLLs) for named pipes, NetBIOS, TCP/IP, DECnet, and others. Additional transports also may be supported by writing new provider DLLs that interface with the ORPC channel object.

Referring back to FIG. 1, the remote system(s) 120 includes at least one application 140 running resident on the remote computer(s) or server(s). A user interface is generated at the remote computer(s) or server(s) for the application(s) 140 and virtualized at the client computer(s) via a dynamically created interface. The virtualization of the application(s) 140 at the client computer(s) includes programmatic data and user interface (UI) information. Programmatic data may include instructions to the computer and user, computer-executable instructions created or modified in response to other instructions, and/or other parameters/data which may be employed in a computing process. Additionally, the virtualization of the application(s) includes icon information for generating at least one application icon(s) associated with the application(s) on the client computer(s). Thus, the user interface appears as if the application(s) were running locally on the client computer(s). Conventionally, a user utilizes a remote desktop file (.rdp file) located on the client computer to access the remote application. The .rdp file includes application information sent from the remote system. However, the conventional system does not provide the appearance of seamless access to the remote system.

The communications channel 130 employed to operatively couple the remote system(s) 120 and the local system(s) 110 can include two channel parts, which may employ the same or different communications protocol(s). A first part of the channel 130 employs an appropriate communications protocol over the channel 130 so that the cross-network and cross-context communications appear transparent to the local system(s) 120. In particular, the first part of the channel 130 is employed to communicate parameters and other data (e.g., input parameters, status, exception information, etc.) between the remote system(s) 120 and the local system(s) 110. As a result, cross-context method calls may be made on the remote system(s) 120 via the first channel part as if the object was local relative to the local system(s) 110.

A second part of the channel 130 is used to communicate UI data between the remote system(s) 120 and the local system(s) 110. In particular, the UI information is generated at the server computer(s) and is provided to the client computer(s), such as by employing RDP. The UI information may include data indicative of a graphical interface as well as associated program data (e.g., an application or instructions) for controlling a display at the client computer(s). The UI information provides the local system(s) 110 with UI capabilities, including display, keyboard and/or pointer redirection. That is, program instructions, such as based on client-side code or user interactions, may interact with and manipulate the remote system(s) 120 via the first channel part, with the interactions being reflected in the UI that is generated at the server and remoted to the client via the second channel part.

The local system(s) 110 facilitates communication of the remote UI data from the remote system(s) 120 so that a visual indication of the remote UI is provided to the display on the client computer(s). As a result, the graphical UI for the application(s) 140 running on the remote computer(s) 120 or server and graphics of the local system(s) 110 running on the client computer(s) are able to share a window area of the display at the client computer(s). For example, the remotely generated UI draws to a known window address at the client computer(s) by employing a suitable protocol in the second part of the channel 130. As a result, the remotely generated UI appears embedded in the local system(s) 110 in substantially the same manner as if the application(s) 140 were running locally at the client computer(s). Any changes to the application(s) 140 thus may be stored locally at the client computer(s) as a modified version of the application(s) embedded within the local system(s) 110, which saving may occur in the form of programmatic data communicated via the channel 130.

Figure 2:
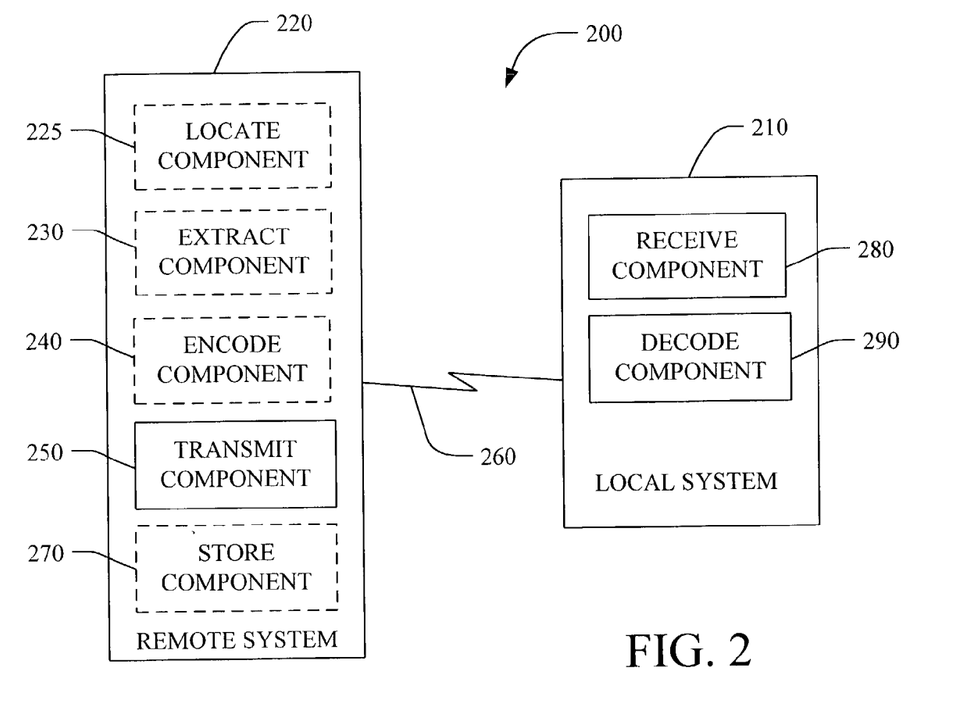
FIG. 2 is a schematic block diagram of a distributed computing system in accordance with an aspect of the present invention.

Turning now to FIG. 2, a distributed computing system 200 is schematically illustrated for providing communication between at least one local system 210 and at least one remote system 220 in accordance with an aspect of the present invention. As described herein, the local system(s) 210 can run at least one application residing on the remote system(s) 220. In order to create the appearance as if the application(s) actually resides on the local system(s) 210, the remote system(s) 220 sends icon information for the application(s) to the local system(s) 210. Thus, when a user selects an icon associated with the remote application(s) on the local system(s) 210, a remote desktop connection is established. In contrast to remote accessing of a host computer (e.g., PC anywhere) where a window is opened displaying a same display as that of the host computer, at least a subset of the transmitted iconic data in connection with the subject invention is persistent at memory of the local computing system, and such subset of data can be updated with later format versions etc. as needed.

The remote system(s) 220 can include a locate component 225 to locate at least one icon resource group from the at least one application. The remote system(s) 220 can also include an extract component 230. The extract component 230 can extract icon resources from at least one desired application. Conventionally, programmatic objects are employed to extract icons. However, the programmatic objects are unable to completely extract all the necessary icon information. For example, in the resource of an icon, there can be a plurality of different icons with a plurality of different displays (e.g., 16 colors, 256 colors, 32 K colors and 16 M colors), a plurality of different formats (e.g., 16×16, 32×32, and 64×64), and a plurality of different resolutions (e.g., 640.times.480, 800.times.600 and 1024.times.768 pixel display resolutions). However, conventional programmatic objects typically only extract a 16×16 icon image using 256 colors. If the icon size on a desktop of the local system 210 is in a 64×64 format, and the icon image is only in a 16×16 format, the remainder of the icon space is filled with a black background. Thus, icons provided by conventional system(s) do not provide an appearance that the remote application(s) is residing on the local system 210. Accordingly, the extract component 230 is operable to extract a substantially greater amount of icon information (e.g., including the plurality of different displays, formats, and resolutions, from the application(s)) than conventional systems.

The remote system(s) 220 can further include an encode component 240 to encode the extracted icon information. The encode component 240 can be a uuencode component. Uuencoding employs a set of algorithms for converting files into a series of 7-bit ASCII characters that can be transmitted over the Internet. The encoded information can also be segmented into multi-part messages so as to maintain the size thereof to a workable level. Moreover, uuencoding is a universal protocol and can be utilized to transfer files between a plurality of different platforms, such as Unix, Windows, etc. It is to be appreciated that many other suitable encoding format can be employed, such as BinHex, MIME, Wincode, etc., and such format use is intended to fall within the scope of the hereto appended claims.

The remote system(s) 220 includes a transmit component 250 to transmit the encoded icon information to the local system(s) 210 via a communications channel 260. The transmit component 250 can employ XML, tag oriented language, and/or any other suitable methods. The remote system(s) 220 can also include a storage component 270 to store the encoded icon information until requested by the local system 210. It is to be appreciated that the icon information can be extracted and/or encoded by a first remote system and transmitted to a local system by a second remote system. Thus, the storage component 270 can be employed to store the encoded icon information from the first remote system until requested by the second remote system.

The local system(s) 210 includes a receive component 280 to receive the icon information from the remote system(s) 220. The local system(s) 210 also includes a decode component 290 to decode the encoded icon information. When the icon information is decoded, the application icon(s) can be displayed to a user of the local system(s) 210. The user can access and run a user selected remote application(s) using only a thin-client on the user's device with a lightweight component installed. To the user, it appears as if the remote application(s) is installed on the user device. However, typically, both the data being processed and the remote application(s) are on the remote system(s) 220. In addition, the remote system(s) 220 allows users to incorporate their own applications and data seamlessly, as well as to provide the users access to information from external service providers.

Figure 3:
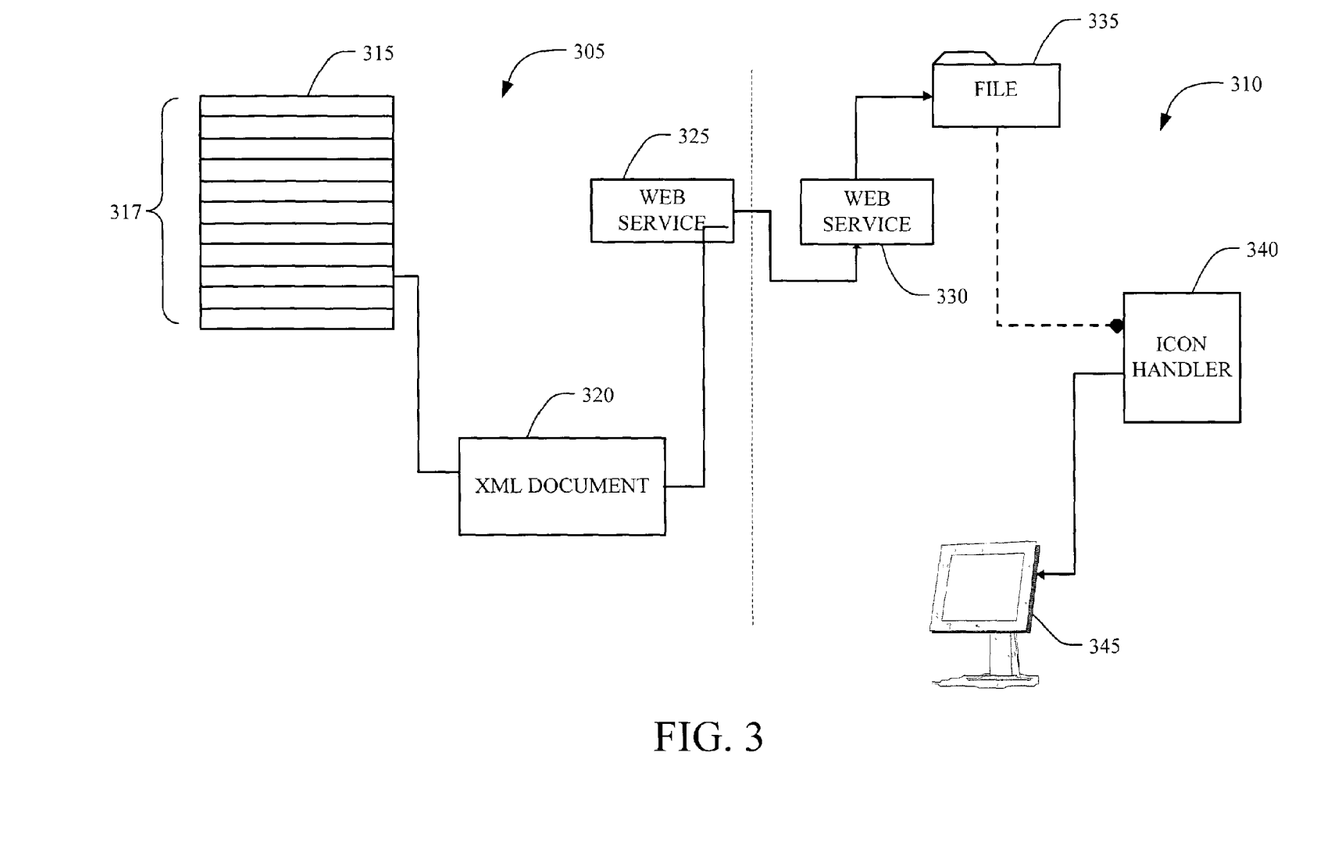
FIG. 3 is an exemplary system for marshalling icon information from a remote system to a local system in accordance with an aspect of the present invention.

FIG. 3 illustrates an exemplary system 300 for marshalling icon information from at least one remote system 305 to at least one local system 310 in accordance with an aspect of the present invention. One or more applications 315 reside on the remote system(s) 305. The application(s) 315 includes a plurality of files 317, at least one of which is an icon resource group. The application files 317 are scanned for the icon resource group. When the icon resource group is identified, icon data from the icon resource group is collected and converted into a suitable format. For example, the icon data can be converted into an .ico file format in memory. The .ico file format can contain several icon images, each with a different size, resolution, and color format. An example of a basic icon file format is as follows:

| NAME | SIZE | DESCRIPTION |
| --- | --- | --- |
| Reserved | 2 byte | =0 |
| Type | 2 byte | =1 |
| Count | 2 byte | Number of Icons in this file |
| Entries | Count * 16 | List of icons |
| Width | 1 byte | Cursor Width (16, 32 or 64) |
| Height | 1 byte | Cursor Height (16, 32 or 64, most commonly = Width) |
| ColorCount | 1 byte | Number of Colors (2, 16, 0=256) |
| Reserved | 1 byte | =0 |
| Planes | 2 byte | =1 |
| BitCount | 2 byte | bits per pixel (1, 4, 8) |
| SizeInBytes | 4 byte | Size of (InfoHeader + ANDbitmap + XORbitmap) |
| FileOffset | 4 byte | FilePos, where InfoHeader starts repeated Count times |
| InfoHeader | 40 bytes | Variant of BMP InfoHeader |
| Size | 4 bytes | Size of InfoHeader structure = 40 |
| Width | 4 bytes | Icon Width |
| Height | 4 bytes | Icon Height (added height of XOR-Bitmap and AND-Bitmap) |

-continued

| NAME | SIZE | DESCRIPTION |
| --- | --- | --- |
| Planes | 2 bytes | number of planes = 1 |
| BitCount | 2 bytes | bits per pixel = 1, 4, 8 |
| Compression | 4 bytes | Type of Compression = 0 |
| ImageSize | 4 bytes | Size of Image in Bytes = 0 (uncompressed) |
| XpixelsPerM | 4 bytes | unused = 0 |
| YpixelsPerM | 4 bytes | unused = 0 |
| ColorsUsed | 4 bytes | unused = 0 |
| ColorsImportant | 4 bytes | unused = 0 |
| Colors | NumberOfColors * 4 bytes | Color Map for XOR-Bitmap |
| Red | 1 byte | red component |
| Green | 1 byte | green component |
| Blue | 1 byte | blue component |
| reserved | 1 byte | =0 |
| repeated NumberOfColors times | | |
| XORBitmap | see below | bitmap |
| ANDBitmap | see below | monochrome bitmap |

The XOR Bitmap is stored as 1-bit, 4-bit or 8-bit uncompressed Bitmap using the same encoding as BMP files. The AND Bitmap is stored in as 1-bit uncompressed Bitmap. Pixels are stored bottom-up, left-to-right. Pixel lines are padded with zeros to end on a 32 bit (4 byte) boundary. Every line will have the same number of bytes. Color indices are zero based, meaning a pixel color of 0 represents the first color table entry, a pixel color of 255 (if there are that many) represents the 256th entry.

When the icon information is converted into a suitable format, the icon information is encoded and packaged in an XML-based mechanism 320, for example. The icon information is then ready for transport (e.g., via a Simple Object Access Protocol (SOAP)). SOAP is a message-based protocol for exchange of information in a decentralized, distributed environment—it is an XML based protocol that consists of three parts: (1) an envelope that defines a framework for describing what is in a message and how to process it, (2) a set of encoding rules for expressing instances of application-defined datatypes, and (3) a convention for representing remote procedure calls and responses. SOAP can potentially be used in combination with a variety of other protocols. Moreover, it is to be appreciated that any suitable protocol can be employed and is considered to fall within the scope of the present invention.

The icon data can be in "stream" format. That is, the icon data can either be stored in a traditional file system or streamed across the Internet from a database or repository. The icon data can be stored in the database until a user logs into the local system(s) 310. Additionally, the icon data can be transmitted via a web service, or application service. Web services allow organizatios to communicate data without intimate knowledge of each other's IT systems behind a firewall. Unlike traditional client/server models, such as a web server/web page system, web services do not provide a user with a graphical user interface (GUI). Rather, web services share business logic, data, and processes through a programmatic interface across a network. Thus, applications interface as compared to users interfacing. The web services can then be added to a GUI, such as a web page or an executable program, to offer specific functionality to users. Moreover, web services allow different application from different sources to communicate with each other without time-consuming custom coding, and because the communication is in XML, web services are not tied to any one operating system or programming language. For example, Java can interface with Perl; and Windows applications can interface with UNIX applications. Accordingly, the remote system(s) 305 can include a web service 325 for transmitting the icon data; and the local system(s) 310 can include a web service 330 for receiving and decoding the icon data.

When the icon data is received by the local system(s) 310, the icon data is decoded and the bytes are streamed into a file 335. The data can be stored in the file 335 in .ico file format, for example. The location of the .ico file is stored in a regkey and documented by an icon handler 340. An icon handler is a type of shell extension that allows for dynamically assigning icons to members of a file class. When a file from the class is displayed, the shell queries the icon handler for an appropriate icon. For instance, an icon handler can assign different icons to different members of the class, or vary the icons based on the current state of the file. The shell is informed that at least one icon is ready to be displayed when a specific file extension is placed on a desktop or viewed.

Hence, transparently to the user, a user is afforded access to functionality distributed within the remote system(s) 305 via employment of what appears to the user as a single application executing on client device 345. The ability to transparently access applications and services in different execution environments greatly increases services and functionality that can be provided to a wide variety of client devices.

Figure 4:
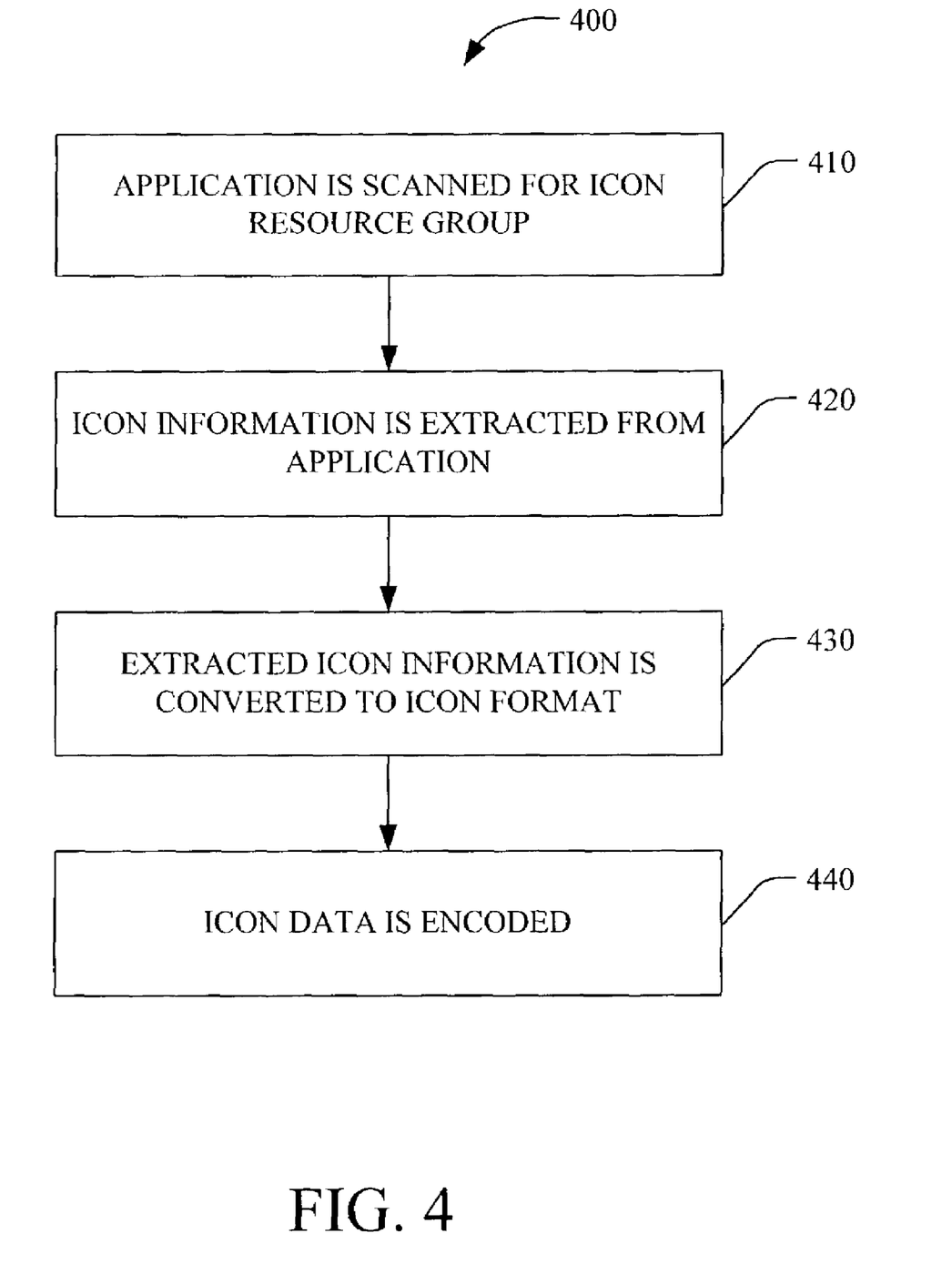
FIG. 4 illustrates a methodology for extracting and encoding icon information in accordance with an aspect of the present invention.
Figure 5:
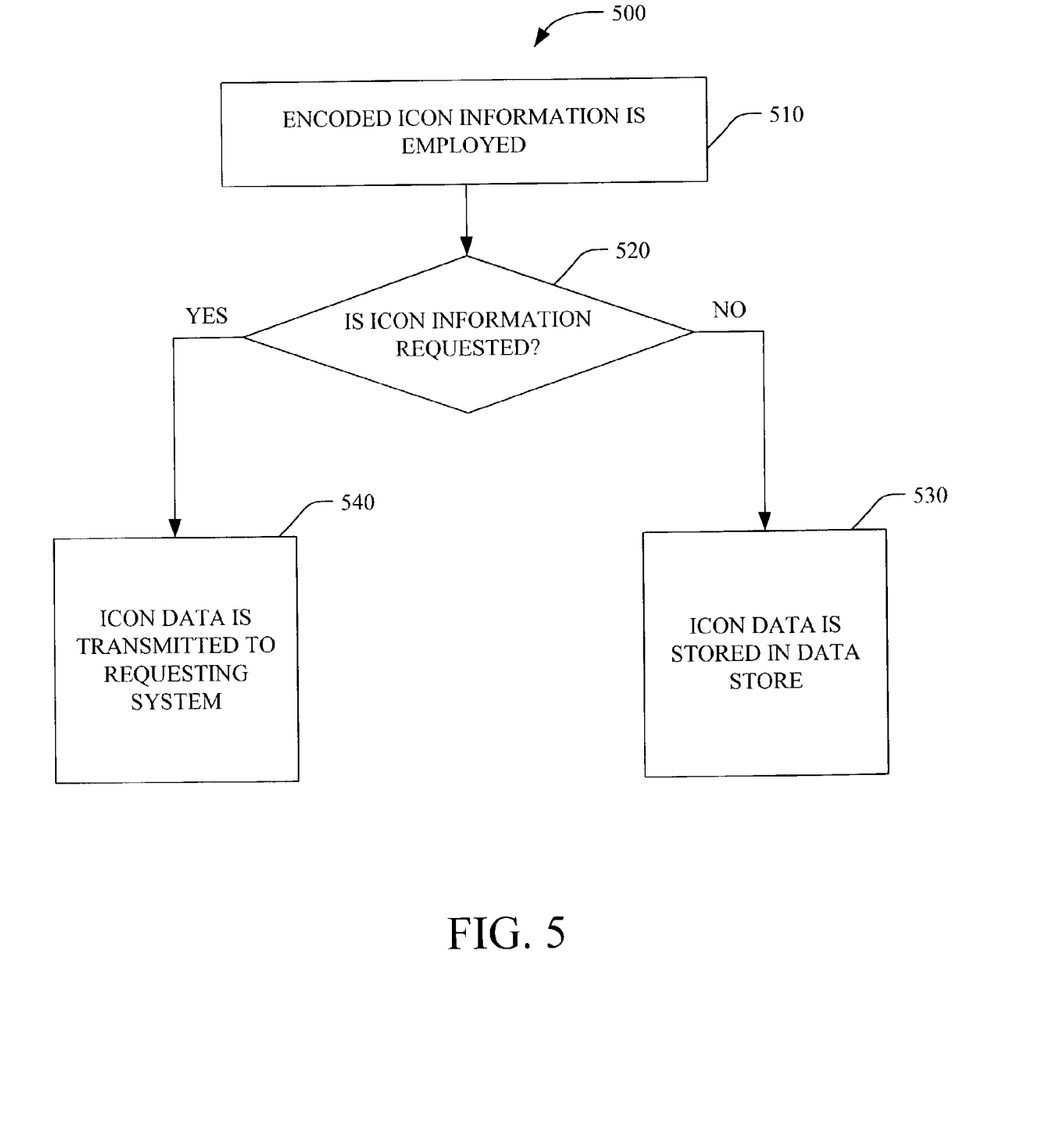
FIG. 5 illustrates a methodology for transmitting icon information in accordance with an aspect of the present invention.
Figure 6:
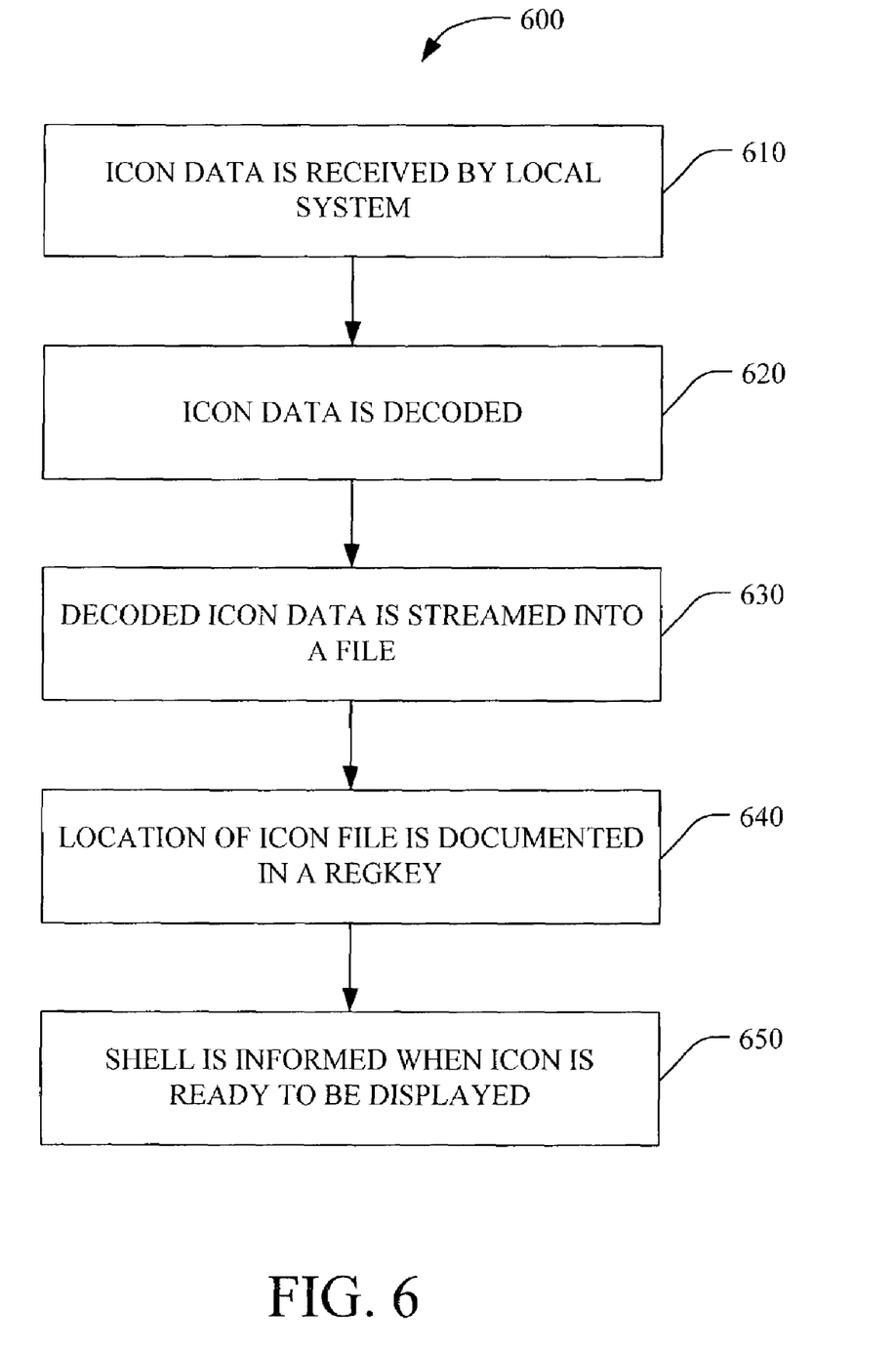
FIG. 6 illustrates a methodology for receiving icon information in accordance with an aspect of the present invention.

FIGS. 4-6 illustrate methodologies for marshalling icon information from a remote system to a local system. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 4 illustrates a methodology 400 for extracting and encoding icon information in accordance with an aspect of the present invention. The methodology 400 begins at 410 where at least one application is scanned for an icon resource group. When the icon resource group is identified, icon information is extracted from the application file at 420. If the application file includes more than one icon, icon information for all of the icons stored in the application file can be extracted. Furthermore, the different icon displays, sizes, and resolutions for all of the icons are also extracted. Any extraction method can be employed to extract the icon information. The extracted icon is then converted into a suitable icon format at 430. For example, the icon can be extracted from an .exe file and converted into an .ico file. At 440, the icon data is encoded. For example, the icon data can be uuencoded. UUencoding encodes the icon files by converting 8-bit characters into 7-bit ASCII text. It is to be appreciated that any other suitable encoding format can be employed, such as BinHex, MIME, Wincode, etc. At 450, the encoded data is packaged into an XML document, for example XML can be employed to store any suitable type of structured information, and to enclose or encapsulate information in order to pass it between different computing systems that would otherwise be unable to communicate. At this stage, the icon information is ready for transport—the data can be retained in a database or sent to another system over a wire.

FIG. 5 illustrates a methodology 500 for transmitting icon information in accordance with an aspect of the present invention. The methodology 500 begins at 510 where a remote system employs icon information that was extracted and encoded by the remote system or retrieved from a second remote system. At 520, it is determined whether one or more local systems have requested the icon information from the remote system. If the icon information has not been requested (NO), a remote application protocol (RAP) can store the icon data in a data store at 530. If the icon information is requested (YES), the icon data is transmitted to the requesting system(s) over a communications channel at 540. The icon information can be transmitted as SOAP-XML, tag oriented language and/or any other suitable method. Moreover, the icon information can be transmitted via a web service.

FIG. 6 illustrates a methodology 600 for receiving icon information in accordance with an aspect of the present invention. The methodology 600 begins at 610 where icon data transmitted by a remote system is received by at least one local system. Then, at 620, the icon data is decoded. For example, if the icon data was uuencoded, the data is then uudecoded back to the data's original format at the receiving end. At 630, the decoded icon data is streamed into a file. An icon handler documents a location of the icon file in a regkey at 640. Then, at 650, a shell (e.g., WINDOWS® operating system) is informed that an icon is ready to be displayed when a specific file extension is placed on the desktop or viewed in Windows Explorer, for example.

Figure 7:
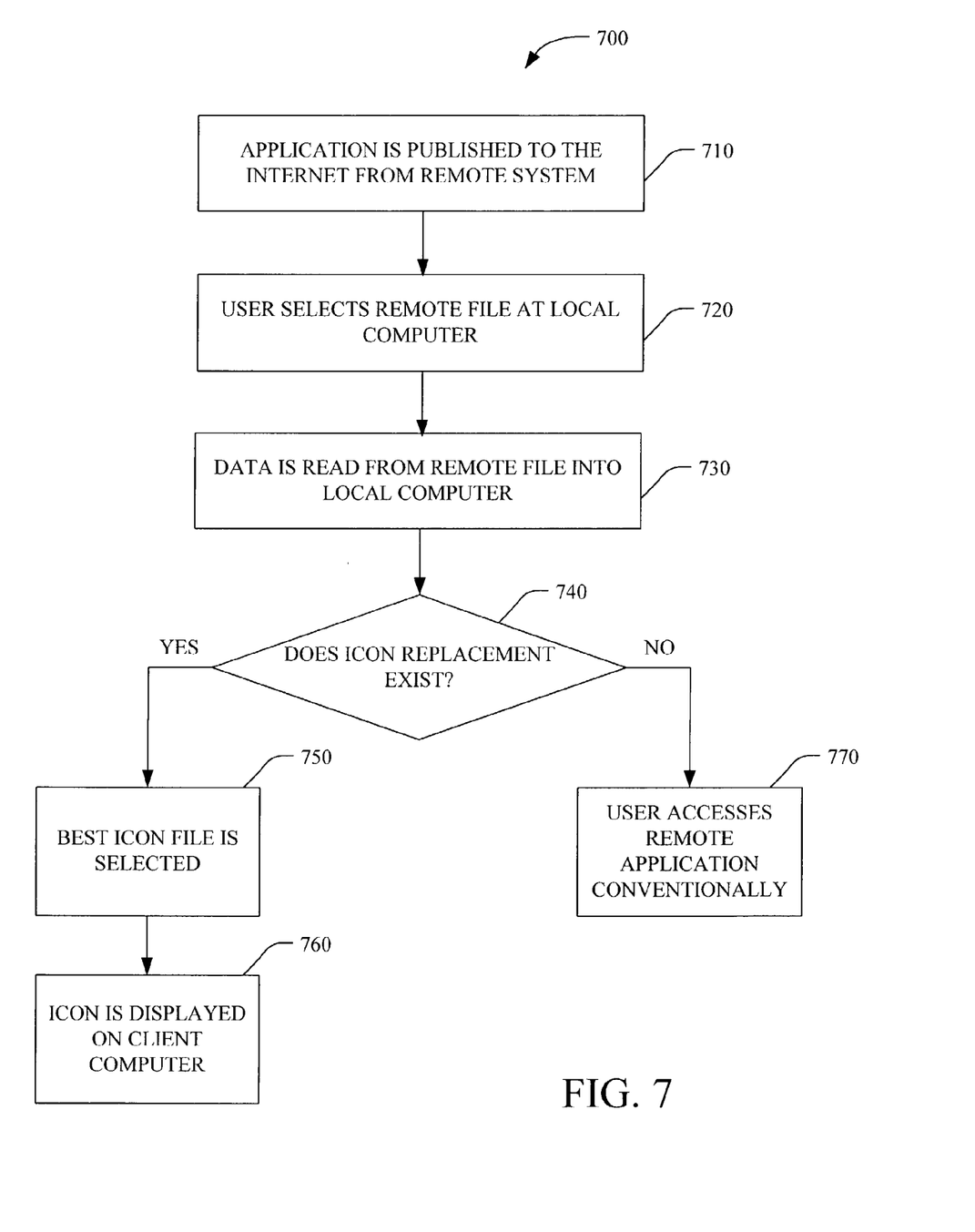
FIG. 7 illustrates a methodology for seamlessly accessing a remote application in accordance with an aspect of the present invention.

FIG. 7 illustrates a methodology 700 for seamlessly accessing at least one remote application in accordance with an aspect of the present invention. The methodology 700 begins at 710 where at least one application is published from a remote system to the Internet. At 720, a user selects a remote file (e.g., an RDP file) at a local client computer. At 730, data is read from the remote file into the client computer. At 740, an icon shell extension reads the remote file and determines whether an icon replacement for the remote file exists. If an icon replacement does exist (YES), the shell selects a best icon file at 750. For example, the best icon file can be the file with the highest icon resolution, icon size, and icon color data. The best icon file is then displayed on the client computer at 760. However, if the icon shell extension reads the remote file and determines that an icon replacement does not exist (NO), the user accesses the remote application in the conventional manner at 770.

Figure 8:
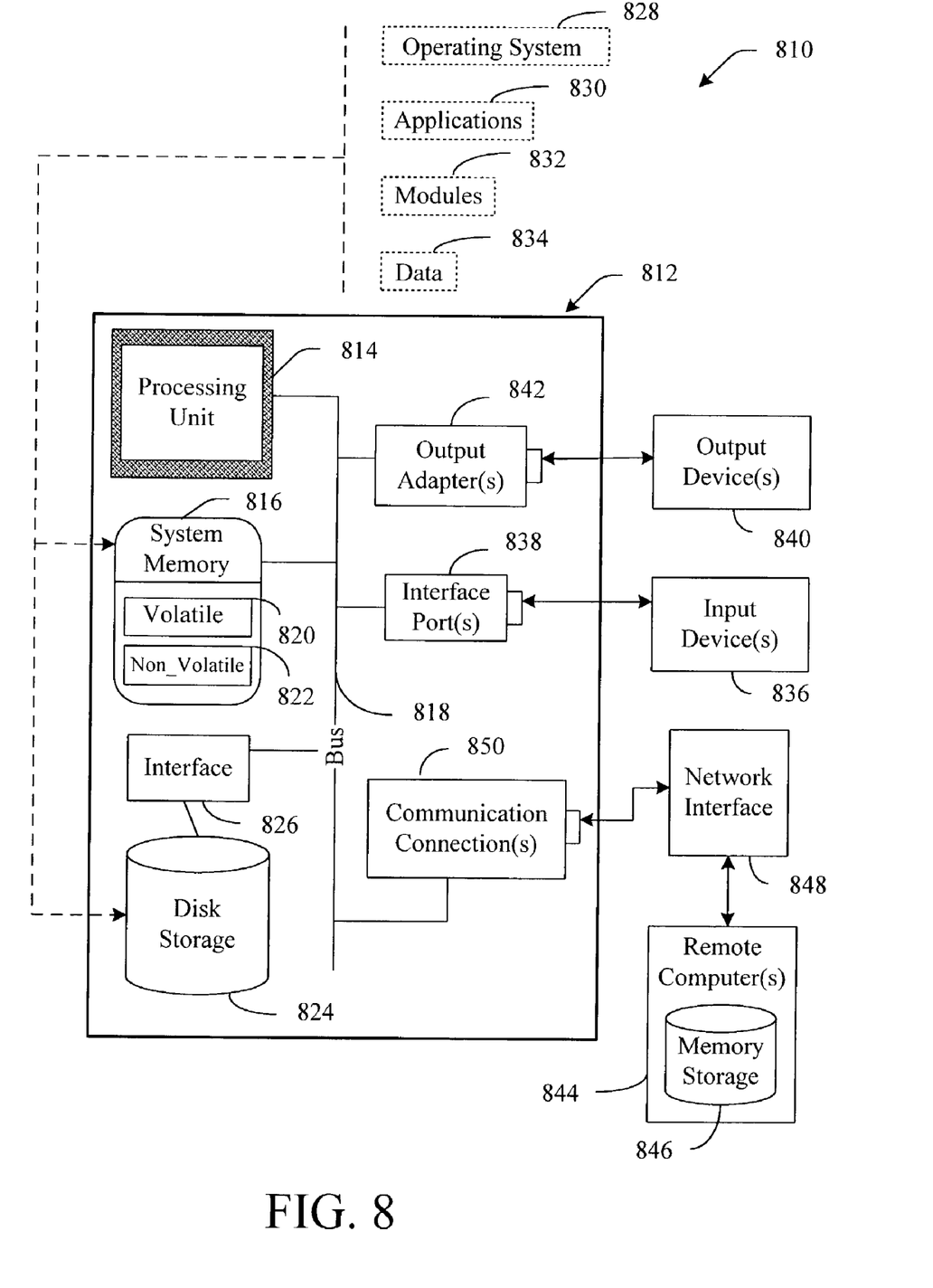
FIG. 8 illustrates an exemplary environment for implementing various aspects of the invention.
Figure 9:
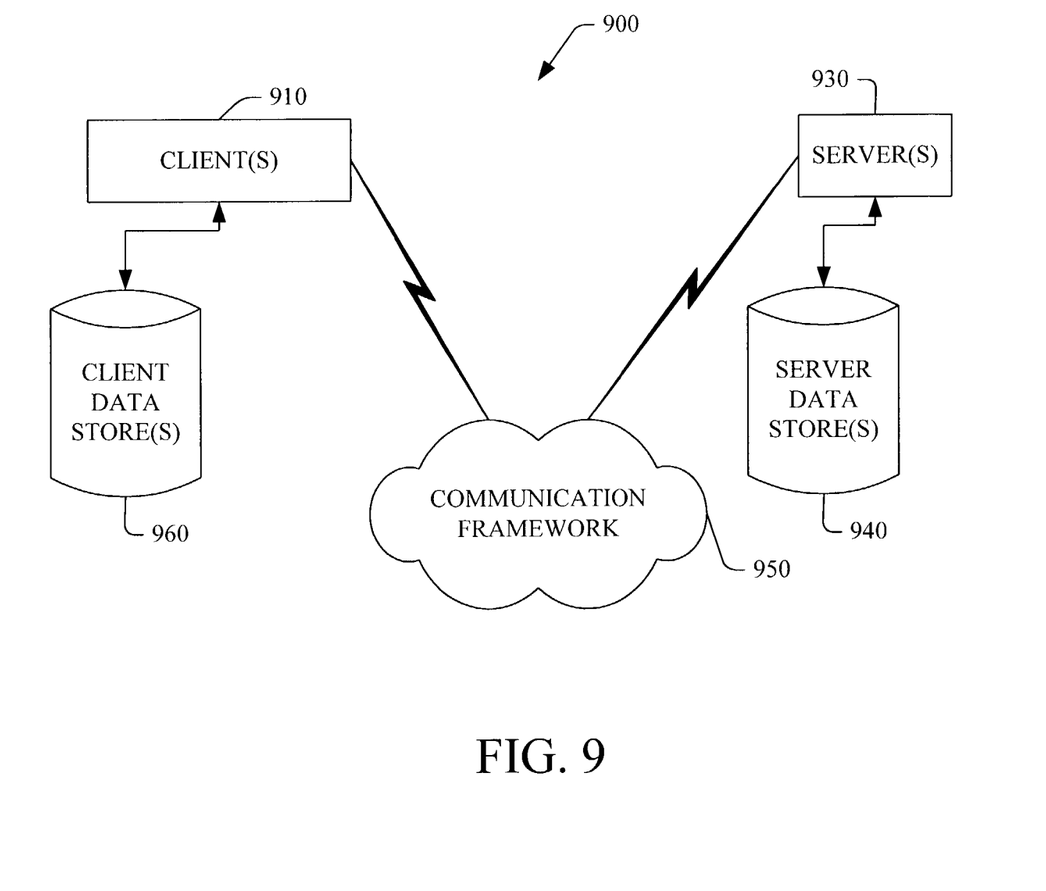
FIG. 9 is a schematic block diagram of an exemplary environment with which the present invention can interact.

In order to provide a context for the various aspects of the invention, FIGS. 8 and 9 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812 and to provide output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates remote computer access, comprising:
  a remote computing system having an application residing thereon;
  a transmit component that transmits an icon resources group associated with the application to a local computing system, the transmitted icon resources group facilitates virtualization of the application at the local computing system upon selection of an icon therein; and
  a display component to display at the local computing system, at least an icon rendered from the icon resources group for the application, the icon is displayed at the local computing system such that it shares a window area of display with graphics of the local computing system and creates an appearance as if the application associated with the icon is resident at the local computing system.

2. The system of claim 1, wherein the transmit component residing at a second remote computing system transmits the encoded icon information via XML.

3. The system of claim 1, wherein the transmit component transmits the encoded icon information via SOAP-XML.

4. The system of claim 1, wherein the virtualization of the at least one application includes programmatic data and user interface information.

5. The system of claim 1, wherein the icon resources group contains all the iconic information necessary to render an icon associated with the application at the local computing system.

6. The system of claim 1 employing deterministic policies in connection with transmitting iconic data.

7. The system of claim 6 inferring a desired level of iconic information to be transmitted to the local computing system.

8. The system of claim 1 comprising an extract component that extracts icon information from the application.

9. The system of claim 8 comprising an encode component that encode the extracted icon information.

10. The system of claim 9, the encode component employing at least one of the following encoding protocols: (1) uuencode, (2) BinHex, (3) MIME and (4) Wincode.

11. A system for extracting, encoding and transmitting icon information, comprising:
a locate component to locate at least one icon resource group from at least one application residing on a remote system;
an extract component to extract the at least one icon resource group from the at least one application;
an encode component to encode the at least one extracted icon resource group; a transmit component to transmit the encoded icon resource group to a local system to facilitate running the at least one application residing on the remote system upon user selection of an icon within the encoded icon resource group and
a display component that displays at least one icon generated from the encoded icon resources group at the local system such that the at least one icon shares a common window area of display with graphics of the local system and that it appears as if the at least one application is residing on the local system.

12. The system of claim 11, wherein the at least one extracted icon resource group includes icons associated with the at least one application.

13. The system of claim 11, wherein the encode component employs uuencoding to encode the at least one extracted icon resource group.

14. The system of claim 11, wherein the at least one extracted icon resource group is encoded into an ico file format.

15. The system of claim 11, further comprising a storage component to store the encoded icon information.

16. The system of claim 11, wherein the encoded icon information includes one of a 32×32 icon image and a 64×64 icon image.

17. The system of claim 11, wherein the encoded icon information includes a plurality of different icon displays, a plurality of different icon formats, and a plurality of different icon resolutions.

18. A system for receiving icon information comprising:
a receive component to receive encoded icon information from a remote system, wherein the encoded icon information is associated with at least one application residing on the remote system;
a decode component to decode the encoded icon information; and
a display component to display at least one icon generated from the icon information such that the icon shares a common window area of display with graphics of the local system and that it appears that the at least one application resides on a local system.

19. The system of claim 18, wherein the at least one icon is displayed as a 32×32 icon image.

20. The system of claim 18, wherein the at least one icon is displayed as a 64×64 icon image.

21. The system of claim 18, wherein the encoded icon information is received via web services.

22. A method for extracting, encoding and transmitting icon information comprising:
identifying an icon resource group in at least one application residing on a remote system;
extracting the icon resource group from the at least one application;
encoding the icon resource group into an icon format;
transmitting the encoded icon information to a local system for remote access of the at least one application at the local system; and
displaying an icon generated from the encoded icon information in a common window area of display with graphics at the local system as if the application were residing on the local system.

23. The method of claim 22, wherein different icon displays, sizes, and resolutions are extracted from the at least one application for rendering of an icon at a local computer via a remote access protocol.

24. The method of claim 22, wherein the icon resource group is encoded into an .ico file format.

25. The method of claim 22, wherein the icon resource group is uuencoded.

26. The method of claim 25, further comprising packaging the encoded icon resource group into an XML document.

27. The method of claim 26, further comprising storing the XML document in a database.

28. A method for transmitting icon information comprising:
encoding icon information associated with at least one application residing on a remote system;
determining when the encoded icon information has been requested by a local system;
transmitting the encoded icon information over a communications channel to the requesting local system to facilitate running the application on the remote system upon selection of an icon associated with the encoded icon information, the transmission being performed via at least one of: web services or SOAP-XML;and
displaying the icon associated with the encoded icon information at the requesting local system and, upon selection of the icon, displaying a graphical user interface for the associated application at the requesting local system in window area of display shared by graphics of the local system as if the at least one application is residing on the requesting local system.

29. The method of claim 28 further comprising:
receiving the encoded icon information from the remote system;
decoding the encoded icon information, wherein the icon information is uudecoded; and
streaming the decoded icon information into a file.

30. The method of claim 29, further comprising reading the file and determining whether an icon replacement exists for the at least one application.

31. The method of claim 30, further comprising selecting a best icon file, wherein the best icon file is the file with a highest icon resolution, icon size, and icon color data.

32. The method of claim 28, the communication channel uses two channel parts which employ same or different communication protocol(s).

33. The method of claim 32, a first channel part communicates program instructions from the local system that interact with and manipulate the remote system with the interactions being reflected in a user interface (UI) that is generated at the remote system and sent to the local system through a second channel part.

34. The method of claim 33, a UI (user interface) for the application running on the remote computer and graphics for the requesting local system share a window area of display at the requesting local system.

35. The method of claim 33, the remotely generated UI draws to a known window address at the local system by employing the second channel part.

36. A remote access computing system comprising:
 means for extracting icon information from at least one application residing on a remote system;
 means for transmitting the icon information associated with the at least one application to a local system;
 means for generating at least one icon from the icon information; and
 means for displaying the at least one icon on a display of the local system in a window area of display shared by graphics of the local system such that it appears as if the at least one application resides on the local system.

37. A data packet transmitted between two or more computer components that facilitates icon marshalling within a remote computing access framework, the data packet comprising:
 icon information associated with at least one application that is run by a local system while residing on a remote system, the icon information comprising a plurality of icon formats and an icon is generated from the icon information for display at the local system in a common window area shared by graphics of the local system as if the at least one application resides on the local system.

38. A computer readable medium storing computer executable components of a remote system, comprising:
 a locate component to locate at least one icon resource group from at least one application residing on a remote system;
 an extract component to extract the at least one icon resource group from the at least one application;
 an encode component to encode the at least one extracted icon resource group;
 a transmit component that transmits encoded icon information from the remote system to a local system to facilitate running the application from the remote system at a local computing device; and
 a display component that displays at least one icon generated from the encoded icon information at the local system such that the at least one icon shares a common window area of display with graphics of the local system and that it appears as if the at least one application is residing on the local system.

39. The computer readable medium of claim 38, the icon information includes all the icons associated with the at least one application.

40. A computer readable medium storing computer executable components of a local system, comprising:
 a receive component to receive encoded icon information from a remote system, wherein the encoded icon information is used to run at a local system, at least one application residing on the remote system; and
 a decode component to decode the encoded icon information to display at least an icon generated from the encoded icon information at the local system in a window area of display shared by graphics of the local system such that it appears as if the at least one application is residing on the local system.

41. A system that facilitates remote accessing of computer applications comprising:
 means for determining that a local computing system desires access to an application residing on a remote computing system:
 means for employing a probabilistic determination analysis in connection with inferring a level of interaction associated with the remote access; means for transmitting iconic information associated with the application to the local computing system so that the local system initiates the application residing on the remote system upon selection of an icon resulting from the iconic information, the amount of iconic information transmitted being based at least in part on the analysis; and
 means for displaying the at least one icon on a display of the local system in a window area of display shared by graphics of the local system such that it appears as if the at least one application resides on the local system.

42. A method to facilitate rendering of iconic data within a remote computing access framework, comprising:
 scanning an application residing on a remote system for an associated icon resource group;
 collecting icon data from the icon resource group and converting the icon data to a flat memory model;
 encoding the converted icon data;
 transmitting the encoded icon data to a local system such that the icons are rendered as if the application resides on the local system; and
 displaying the icon associated with the encoded icon information at the requesting local system in a shared window area of display with graphics of the local system as if the at least one application is residing on the requesting local system.

43. The method of claim 42, further comprising packaging the encoded icon data as an XML document.

* * * * *